(12) United States Patent
Jones et al.

(10) Patent No.: US 6,209,329 B1
(45) Date of Patent: *Apr. 3, 2001

(54) CRYOGENIC PROCESSOR FOR LIQUID FEED PREPARATION OF A FREE-FLOWING FROZEN PRODUCT

(75) Inventors: Curt D. Jones, Paducah, KY (US); Stan Jones, Vienna, IL (US)

(73) Assignee: Dippin' Dots, Inc., Paducah, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/617,724

(22) Filed: Jul. 17, 2000

Related U.S. Application Data

(63) Continuation-in-part of application No. 09/451,046, filed on Nov. 30, 1999, which is a continuation of application No. 09/066,140, filed on Apr. 24, 1998, now Pat. No. 6,000,229.

(51) Int. Cl.$^7$ ................................ F25C 1/00; F25D 17/02
(52) U.S. Cl. ..................................... 62/74; 62/64; 62/377
(58) Field of Search .................................. 62/64, 74, 67, 62/373, 374, 375, 376

(56) References Cited

U.S. PATENT DOCUMENTS

| 4,009,740 | 3/1977 | Michielli | 141/172 |
| 4,509,339 | 4/1985 | Mehlan et al. | 62/450 |
| 4,655,047 | * | 4/1987 | Temple et al. | 62/64 |

(List continued on next page.)

Primary Examiner—William Doerrler
(74) Attorney, Agent, or Firm—Thomas, Kayden, Horstemeyer & Risley

(57) ABSTRACT

The cryogenic processor comprises a tray or multiple trays that receives liquid feed composition from a delivery source. A plurality of orifices or combination of orifices and feed droppers, hereinafter feed assembly, associated with the tray are specifically arranged and adapted for discharging uniformly sized droplets of the liquid composition from the tray. In a key aspect of the improvement, a regulated flow of ambient air is provided to the feed assembly by a venturi assembly or other source of partial vacuum. The vacuum assembly allows ambient air to be pulled into the cryogenic processor and across the feed assembly which prevents liquid composition from freezing and accumulating in the flow channels of the feed assembly, thus allowing continuous formation of uniformly sized beads. Adjustable door inlets are also adapted and arranged as a means to control the flow of incoming ambient air, as well as the flow of outgoing gaseous refrigerant. Further, a filter is provided at the air inlet so that the ambient air is filtered to remove any microbiological contaminants before introducing the ambient air to the region of the feed tray. In accordance with another embodiment and aspect of the present invention, the outer structure of the cryogenic processor includes a "vacuum jacket" to improve the thermal characteristics of the processor. In this regard, the outer structure of the processor includes a double wall structure. The inner region is this double wall structure is evacuated to provide improved thermal conductivity properties, and thereby improves the efficiency of the cryogenic processor.

19 Claims, 3 Drawing Sheets

U.S. PATENT DOCUMENTS

| | | | |
|---|---|---|---|
| 4,730,750 | 3/1988 | Ficken | 221/124 |
| 4,741,178 | 5/1988 | Fujiu et al. | 62/525 |
| 4,831,841 | 5/1989 | Falk | 62/381 |
| 4,920,764 | 5/1990 | Martin | 62/259 |
| 5,027,698 | 7/1991 | Chirnomas | 99/450 |
| 5,121,854 | 6/1992 | Trouteaud et al. | 221/15 |
| 5,126,156 * | 6/1992 | Jones | 426/418 |
| 5,224,415 | 7/1993 | McFadden et al. | 99/357 |
| 5,281,429 | 1/1994 | Zevlakis | 426/389 |
| 5,305,615 | 4/1994 | McFadden et al. | 62/378 |
| 5,319,939 | 6/1994 | McFadden et al. | 62/63 |
| 5,400,614 | 3/1995 | Feola | 62/233 |
| 5,405,054 | 4/1995 | Thomas | 222/95 |
| 5,417,081 | 5/1995 | Rudick et al. | 62/440 |
| 5,421,484 | 6/1995 | Beach | 222/95 |
| 5,463,878 | 11/1995 | Parekh et al. | 62/394 |
| 5,557,944 | 9/1996 | Hirano et al. | 62/469 |
| 5,704,216 | 1/1998 | Hirano et al. | 62/114 |
| 5,718,119 | 2/1998 | Wakita et al. | 62/85 |
| 5,772,072 | 6/1998 | Prescott et al. | 221/121 |
| 5,842,349 | 12/1998 | Wakita et al. | 62/85 |
| 6,000,229 * | 12/1999 | Jones et al. | 62/74 |

* cited by examiner

CRYOGENIC PROCESSOR FOR LIQUID FEED PREPARATION OF A FREE-FLOWING FROZEN PRODUCT

CROSS-REFERENCE TO RELATED APPLICATIONS

This application is a continuation-in-part of U.S. patent application Ser. No. 09/451,046, filed Nov. 30, 1999, which is a continuation of U.S. patent application Ser. No. 09/066,140 (now U.S. Pat. No. 6,000,229), filed on Apr. 24, 1998, both entitled "Cryogenic Processor for Liquid Feed Preparation of a Free-Flowing Frozen Product and Method for Freezing Liquid Composition." Both of these prior applications are hereby incorporated by reference in their entireties.

FIELD OF THE INVENTION

The present invention relates generally to a frozen product preparation apparatus and, more particularly, to a cryogenic processor for liquid feed preparation of a free-flowing frozen product.

DESCRIPTION OF THE PRIOR ART

Sales of ice cream and frozen yogurt products have risen dramatically in recent years, and applicants herein have captured a portion of this product market through the development of a unique novelty ice cream, frozen yogurt and ice product in the form of beads. This product, marketed under the trademarks "Dippin' Dots®" and "Ice Cream of the Future®", has become very popular in specialty stores, at fairs and theme parks, and through vending machines.

Applicants have proprietary rights in the method of preparing and storing the product pursuant to U.S. Pat. No. 5,126,156, issued Jun. 30, 1992, herein incorporated by reference, as well as rights associated with improvements pursuant to U.S. Pat. No. 5,664,422, issued Sep. 9, 1997, herein incorporated by reference. As is generally described therein, the patented method involves delivering flavored liquid dairy and other alimentary compositions to a feed tray and then dripping the composition into a freezing chamber. The feed tray comprises a plurality of orifices through which liquid composition passes to fall into the freezing chamber, either in the form of droplets or liquid streams, which streams break into droplets before freezing. Each orifice may also have a corresponding feed dropper which is downwardly disposed in relation to the tray such that the liquid composition passes from the tray through an orifice and then through an associated feed dropper where a droplet or liquid stream is formed. The orifices or combination of orifices and feed droppers will hereinafter be referred to collectively as feed assemblies.

The falling droplets of liquid composition freeze rapidly in the freezing chamber due to the presence of both gaseous and liquid refrigerant in the area between the orifices and the bottom of the freezing chamber, thereby forming solid beads of flavored ice cream, yogurt or other alimentary products, such as flavored ice. The frozen beads are removed from the freezing chamber and packed for distribution and later consumption.

For economic efficiency, it is important to utilize as many BTU's as possible from the liquid refrigerant during the droplet freezing process. This is typically done by utilizing the gaseous portion of the refrigerant generated to surround the liquid composition as it is being frozen to pre-cool the falling droplets prior to entering the liquid refrigerant. However, if the gaseous refrigerant is allowed to completely surround the feed assembly, the liquid composition may begin to freeze within the droppers of the dropper assembly potentially resulting in a reduced product output. Therefore, it is undesirable to have the ambient temperature that immediately surrounds the dropper assembly and feed tray to become too cold.

In order to improve the production process, a method to reduce the possibility of feed assembly freeze-up and thereby allow the feed assemblies to remain unobstructed of frozen composition during operation is desired. A temperature balance between the feed assembly and the upper portion of the freezing chamber is required so that free flow of the liquid composition through the feed assemblies is achieved resulting in the continuous formation of uniform frozen beads.

As is known, the liquid nitrogen used as the refrigerant in the cryogenic processor vaporizes at a very low temperature. Ambient temperature outside the processor thermally conducts through the insulated processor walls to raise the temperature of the liquid nitrogen therein. This increases the vaporization rate of the liquid nitrogen therein, demanding a larger volume of liquid nitrogen to maintain a constant liquid level within the processor. Accordingly, it is also desired to improve the thermal and insulating characteristics of the processor, to reduce the vaporization rate of the liquid nitrogen.

SUMMARY OF THE INVENTION

The present invention is generally directed to an improved cryogenic processor for liquid feed preparation of a free-flowing frozen product and a method for its use. It has been determined through experimentation that structural modifications can be made to the prior art apparatus to bring about the desired result. A primary object of the present invention is to provide an improved cryogenic processor incorporating a gas diffusion chamber that will substantially eliminate the formation of frozen product in the feed assembly during the production of the free-flowing frozen product.

It is another object to provide a mechanism that reduces the amount of contaminants that may reach the frozen product.

It is yet another object to decrease the thermal conductivity of the processor walls, to thereby improve the efficiency of the cryogenic processor.

Additional objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved cryogenic processor for liquid feed preparation of a free-flowing frozen product and a method for its use, that achieves the stated goals are presented.

The cryogenic processor comprises a tray that receives liquid feed composition from a delivery source. The liquid composition may be mixed with other substances in predetermined amounts in a premixing device. A plurality of orifices or combination of orifices and feed droppers, hereinafter feed assembly, associated with the tray are specifically arranged and adapted for discharging uniformly sized droplets of the liquid composition from the tray. In a key aspect of the improvement, a regulated flow of ambient air is provided to the feed assembly by a venturi assembly or other source of partial vacuum. The vacuum assembly allows ambient air to be pulled into the cryogenic processor and across the feed assembly which prevents liquid composition from freezing and accumulating in the flow channels of the feed assembly, thus allowing continuous formation of uniformly sized beads. Adjustable door inlets are also adapted and arranged as a means to control the flow of incoming ambient air, as well as the flow of outgoing gaseous refrigerant. Further, a filter is provided at the air inlet so that the ambient air is filtered to remove any microbiological contaminants before introducing the ambient air to the region of the feed tray.

The gas diffusion chamber also incorporates an ambient air inlet port, arranged at substantially 90° to 180° from the exit port, which communicates with the vacuum assembly. Both the exit port and the ambient air inlet port are adapted to adjust the height of the gaseous refrigerant in the gas diffusion chamber as well as the volume of incoming ambient air passing across the feed assembly. The velocity of the incoming ambient air can also be varied by adjusting the strength of the vacuum produced by the vacuum assembly. However, if excess vacuum is generated without the proper addition of ambient air, then excess evaporation of the liquid refrigerant is achieved which can be detrimental to freezing efficiency. Likewise, if excess ambient air is introduced to the gas diffusion chamber, the temperature of the gaseous refrigerant is unnecessarily raised resulting in a decrease in droplet pre-cooling efficiency, as well as a decrease in post-cooling efficiency for processes using the exit gases. Therefore, for maximum efficiency, temperatures must be monitored closely at various locations in the gas diffusion chamber. This configuration limits the amount of refrigerant required to carry out the freezing function while promoting formation of a uniform frozen beaded product, thereby reducing production costs. Additionally, increased conical shaping of the freezing chamber allows for increased output rates of frozen beaded product at the outlet of the freezing chamber due to the efficient accumulation of frozen beads at the bottom of the freezing chamber.

In accordance with another embodiment and aspect of the present invention, the outer structure of the cryogenic processor includes a "vacuum jacket" to improve the thermal characteristics of the processor. In this regard, the outer structure of the processor includes a double wall structure. In prior art systems, the inner region of this double wall structure was filled with an insulating foam glass. However, in accordance with one aspect of the invention, the foam glass is replaced by an evacuated chamber (i. e., vacuum jacket). This evacuated chamber has improved thermal conductivity properties, and thereby improves the efficiency of the cryogenic processor.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE INVENTION

Figure 1:
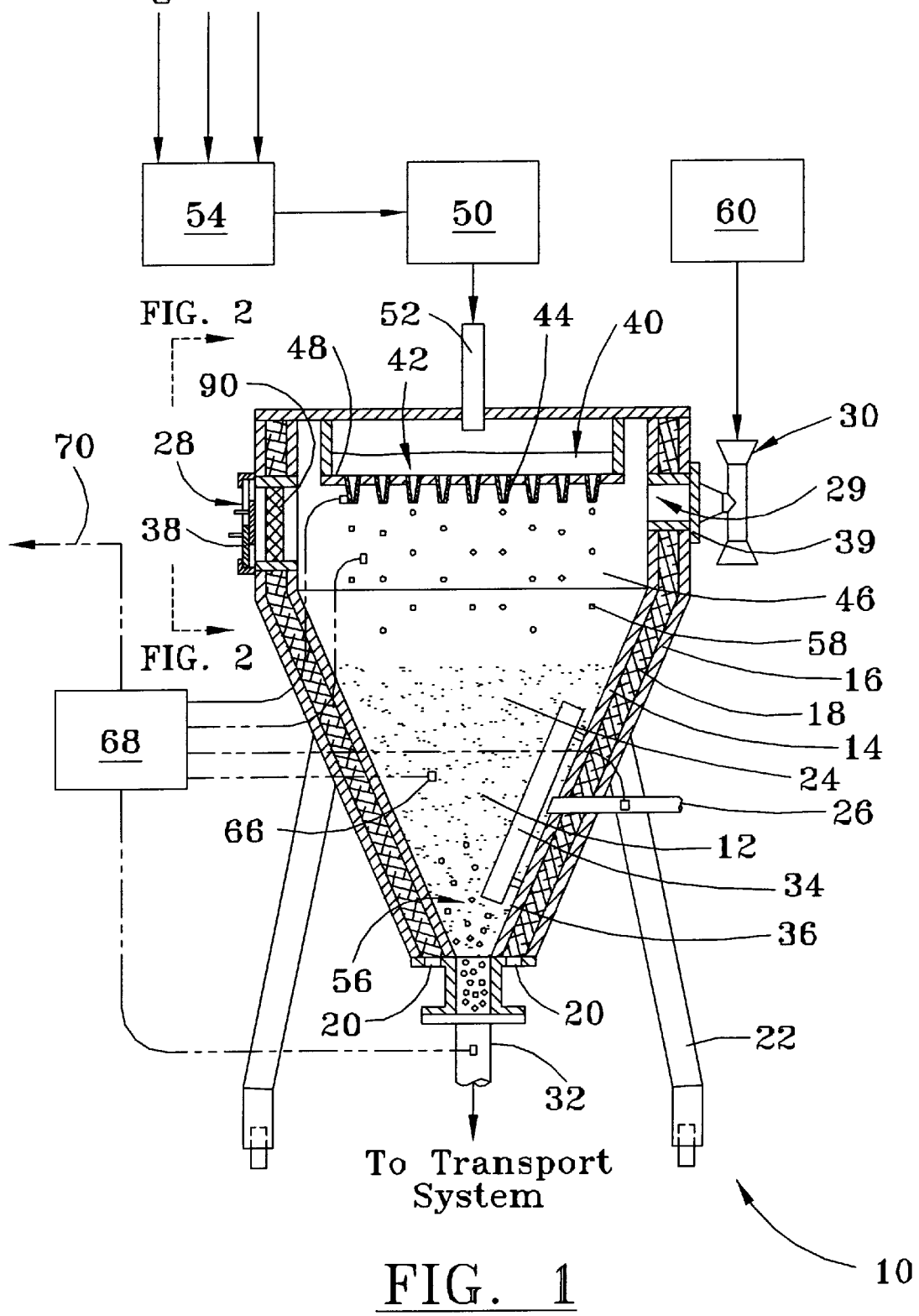
FIG. 1 is a cross-sectional elevation of the improved cryogenic processor.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Reference is now made to FIG. 1 showing an improved cryogenic processor constructed in accordance with the preferred embodiment of the present invention to produce free-flowing frozen product in the form of small beads. The fundamental method utilized to produce the product is described in detail in U.S. Pat. No. 5,126,156, and will be summarized below in order to facilitate an understanding of this unique production process. The apparatus as depicted in FIG. 1 enhances the efficiency of the prior art production process and increases product yield as described below.

Cryogenic processor 10 includes a freezing chamber 12 that is most preferably in the form of a conical tank that holds a liquid refrigerant therein. Freezing chamber 12 incorporates an inner shell 14 and an outer shell 16. Insulation 18 is disposed between the inner shell 14 and outer shell 16 in order to increase the thermal efficiency of the chamber 12. The freezing chamber 12, as shown in FIG. 1, is a free-standing unit supported by legs 22. Alternatively, the freezing chamber 12 may be disposed in a frame that is specially built to support the processor 10 while in use.

Refrigerant 24, preferably liquid nitrogen in view of its known freezing capabilities, enters the freezing chamber 12 by means of refrigerant inlet 26. Refrigerant 24 entering chamber 12 through inlet 26 is used to maintain a predetermined level of liquid refrigerant in the freezing chamber and must be added to replace refrigerant 24 that is lost by evaporation or by other means incidental to production. Gaseous refrigerant that has evaporated from the surface of the liquid refrigerant 24 in freezing chamber 12 primarily vents to the atmosphere through exit port 29 which cooperates with the vacuum assembly 30, which can be in the form of a venturi nozzle. Extraction of the frozen beads occurs through product outlet 32 adapted at the base of the freezing chamber 12.

When incoming refrigerant 24 enters the freezing chamber 12 through inlet 26, a swirling or cyclonic motion of refrigerant 24 may form in the freezing chamber 12 depending on the amount of refrigerant 24 allowed to enter through inlet 26 and the flow velocity of the incoming refrigerant 24. This cyclonic motion is not favorable to the production process because the frozen beads awaiting extraction at the bottom of freezing chamber 12 may be swept into the swirling refrigerant and thus prevented them from falling to the bottom of the freezing chamber for collection. A non-uniform beaded product can also be produced in this turbulent environment. This unwanted cyclonic motion of incoming refrigerant is prevented by baffles 34 mounted to interior surface 36 of inner shell 14. Baffles 34 extend inwardly from interior surface 36 in the vicinity of the refrigerant inlet 26. Additionally, the baffles 34 are oriented so that their lengths are substantially vertical within the freezing chamber 12.

An ambient air inlet port 28 with adjustment doors 38 and exit port 29 with adjustment doors 39 are provided to adjust the level of gaseous refrigerant which evaporates from the surface of the liquid refrigerant 24 so that excessive pressure is not built up within the processor 10 and freezing of the liquid composition in the feed assembly 40 does not occur.

A feed tray 48 receives liquid composition from a delivery source 50. Typically, a pump (not shown) drives the liquid composition through a delivery tube 52 into the feed tray 48. A premixing device 54 allows several compositions, not all of which must be liquid, such as powdered flavorings or other additives of a size small enough not to cause clogging in the feed assembly 40, to be mixed in predetermined concentrations for delivery to the feed tray 48.

It is recognized that in order to create uniformly sized beads 56 of frozen product, uniformly sized droplets 58 of liquid composition are required to be fed through gas diffusion chamber 46 to freezing chamber 12. The feed tray 48 is designed with feed assembly 40 that forms droplets 58 of the desired character. The frozen product takes the form of beads that are formed when the droplets 58 of liquid composition contact the refrigerant vapor in the gas diffusion chamber 46, and subsequently the liquid refrigerant 24 in the freezing chamber 12. After the beads 56 are formed, they fall to the bottom of chamber 12. A transport system connects to the bottom of chamber 12 at outlet 32 to carry the beads 56 to a packaging and distribution network for later delivery and consumption.

In accordance with one aspect of the invention, the preferred embodiment is designed with an incorporated vacuum assembly 30 which can take the form of a venturi. The vacuum assembly 30 cooperates with air inlet 28 and adjustment doors 38 so that an ambient air-flow passes through the inlet 28 and around feed assembly 40 to ensure that no liquid composition freezes therein. This is accomplished by mounting the vacuum assembly 30 and air inlet 28 on opposing sides of the gas diffusion chamber 46 such that the incoming ambient air drawn by the vacuum assembly 30 is aligned with the feed assembly. In this configuration, ambient air flows around the feed assembly warming it to a sufficient temperature to inhibit the formation of frozen liquid composition in the feed assembly flow channels. Air source 60, typically in the form of an air compressor, is attached to vacuum assembly 30 to provide appropriate suction to create the ambient air flow required.

Figure 2:
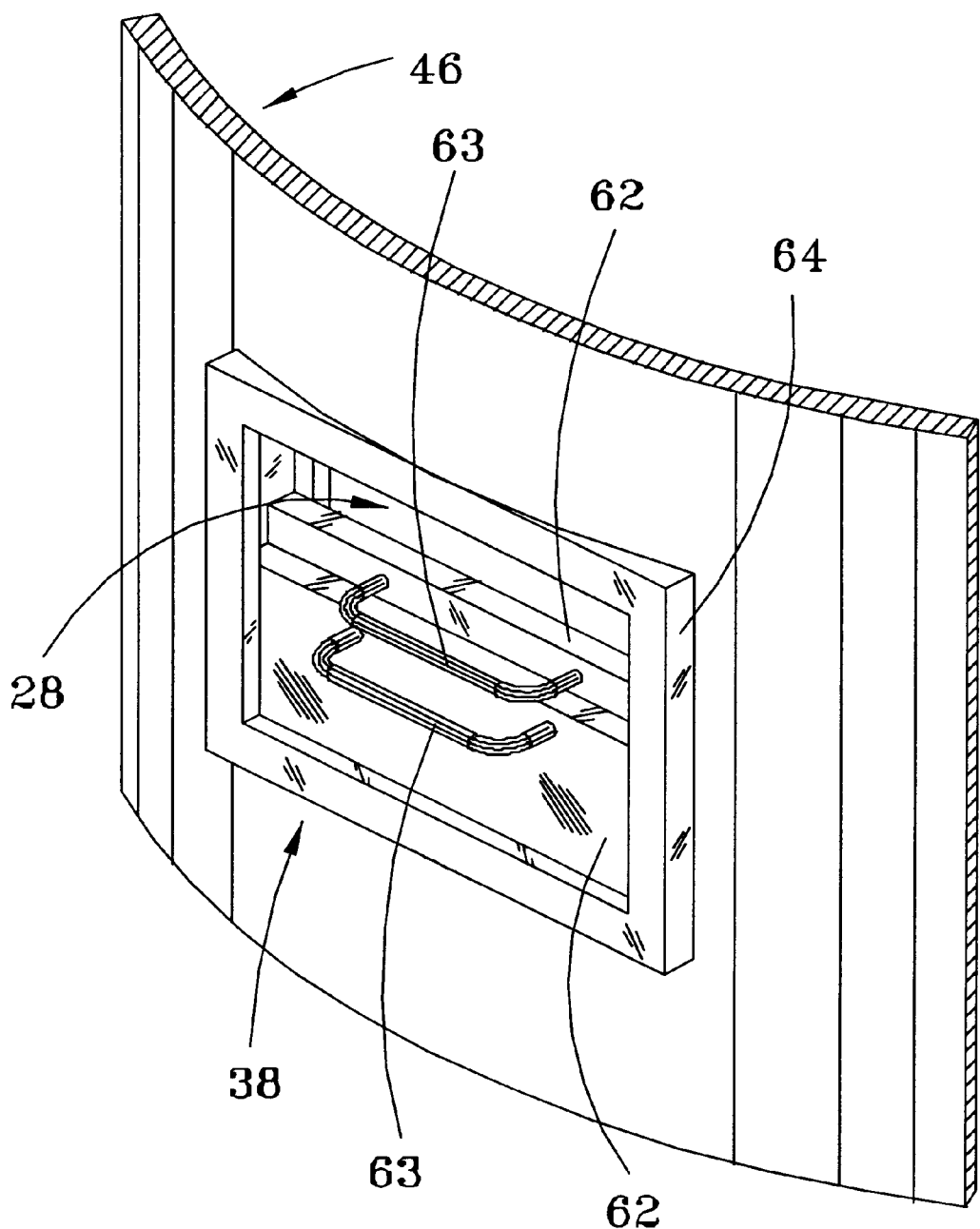
FIG. 2 is a cut-away perspective view of the adjustable air inlet doors.

As mentioned above, air inlet 28 incorporates adjustment doors 38 for controlling the amount of incoming ambient air. As shown in FIG. 2, the preferred embodiment of the doors 38 is a series of slidable door segments 62 mounted within a frame 64. This configuration accommodates numerous adjustment combinations so that the desired flow rates may be achieved between a full open setting where the doors 38 expose a maximum size inlet opening and a full closed setting where the doors completely block the inlet 28, thereby preventing ambient air flow. It should be recognized by those of ordinary skill in the art that numerous other embodiments of the inlet doors 38 may be used for achieving the desired results, i.e. a variable flow nozzle, or an adjustable inlet vent, to mention but a few.

Figure 3:
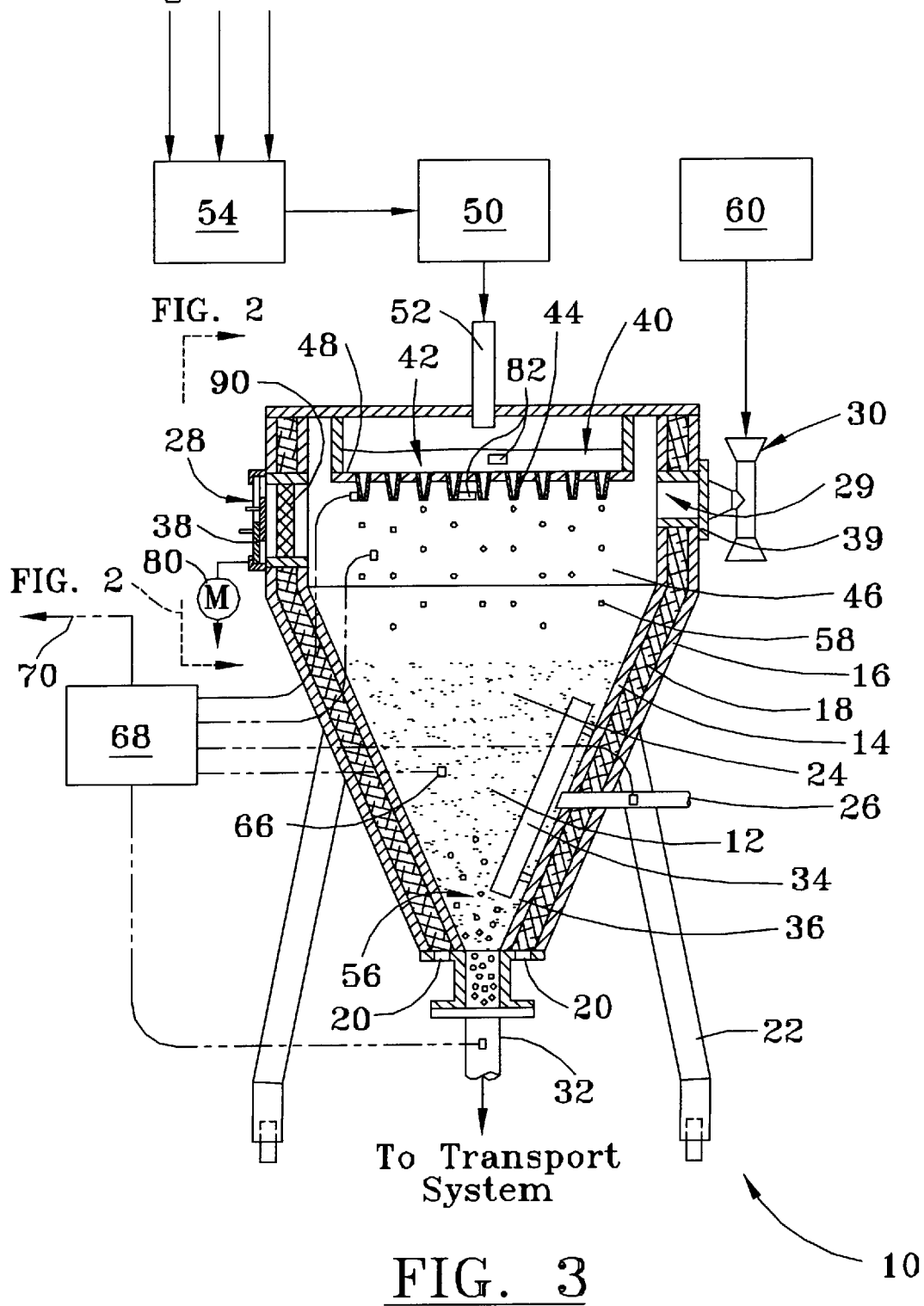
FIG. 3 is a cross-sectional elevation of an improved cryogenic processor, similar to FIG. 1, but further illustrating motorized control of air inlet doors.

In one embodiment, the doors 62 are manually adjusted. An operator outside the processor 10 may adjust the position of the doors 62 based upon observations, experience, or other factors. In another embodiment, the doors 62 may be automatically adjusted by a motor 80 (see FIG. 3), or other mechanism capable of moving the doors. In such an embodiment, temperature sensors 82 (or other appropriate sensors) may be utilized to sense the temperature surrounding the feed assembly 40. As the temperature falls below a predetermined temperature the motor 80 could adjust the doors 62 to increase the size of the inlet 28. Conversely, as the temperature rises above a predetermined temperature, the motor 80 could adjust the doors 62 to decrease the size of the inlet 28.

In yet another embodiment, the inlet 28 may be held constant and the vacuum source 60 may be adjusted to control the temperature surrounding the feed assembly 40. In such an embodiment, as the temperature 60 falls below a predetermined level, the vacuum source 60 may be controlled to increase the air flow across the droppers 44. Conversely, as the temperature rises above a predetermine temperature, the vacuum source 60 may be controlled to decrease the air flow across the droppers 44.

Further still, the temperature surrounding the feed assembly 40 may be controlled through a controlled combination of the inlet 28 size and the rate of air flow across the droppers 44. That is, temperature control may be implemented through a combination of motor 80 control and vacuum source 60 control.

In yet another embodiment, the motor 80 control and/or the vacuum source 60 control may be based upon the rate of flow liquid composition into the feed assembly. Liquid level sensors may be utilized to sense the level of liquid composition within the feed assembly. Under normal operation (with all droppers 44 completely open), a certain flow rate (of liquid composition into the feed assembly) will be established. If this rate decreases, such a decrease may be presumed to result from a formation of ice within the droppers 44. As a result, the motor 80 may be controlled to increase the size of inlet 28 and/or the vacuum source 60 may be controlled to increase the flow of air across the droppers 44.

Several sensors 66 may be incorporated to measure numerous operating values, such as freezing chamber temperature, refrigerant level, etc. These sensors each provide an input signal to control device 68 which monitors the production process and provides control output signals 70 to facilitate automatic production of the frozen beads. For purposes of illustration, these sensors have been included in FIG. 1 simply as dots. It will be appreciated, however, that the actual structure of the sensors will vary in accordance with the actual implementation.

Numerous benefits result from the use of the improved invention. In contrast to prior art designs where the freezing of liquid composition in the feed assembly created the need to discontinue the production process while the feed assembly was warmed and subsequently cleaned, the present invention prevents the liquid from freezing in the feed assembly. Thus, the production process may continue uninterrupted.

Additionally, improperly frozen liquid composition represents waste, which must be screened and removed from the uniform beaded product prior to packaging. This waste and the processes associated with removing the waste from the desired product, e.g. operation of separation devices, decreases production efficiency. The present invention eliminates this waste. By use of the novel gas diffusion chamber and vacuum assembly, the need for a separation requirement is successfully eliminated, thus the prior art screening components and the power utilized to operate them are no longer required.

In accordance with one embodiment of the present invention, an air intake filter 90 (see FIGS. 1 and 3) may be disposed at the air inlet 28. Although illustrated on the inside of the doors 62, the intake filter 90 may alternatively be positioned on the outside of the doors 62. Although significant measures are taken to ensure that the environment surrounding the processor 10 is maintained in an extremely sanitary fashion, it has been recognized that certain airborne contaminants may nevertheless be present. As a result, the air intake filter 90 is provided to further sanitize and screen the air that is allowed to flow across the feed assembly 40, thereby resulting in a more pure and clean frozen product.

Consistent with the scope and spirit of the present invention, the material used to form the filter 90, the filter density, porosity, and other characteristics may be varied. Indeed, the invention is not limited to any of these particulars of the intake filter 90. Notwithstanding, a filter constructed in accordance with a preferred embodiment of the invention will remove all contaminants 0.2 microns in size or larger.

In accordance with yet another aspect of the present invention, the thermal characteristics of the processor 10 are improved. Preferably, the processor 10 is constructed with a double-wall construction, having an inner wall 14 and an outer wall 16. Previous generation processors have included foam glass insulation between the walls 14 and 16. However, in accordance with one aspect of the invention, a vacuum jacket is instituted to insulate the liquid refrigerant within the processor 10. Accordingly a port (not shown) and vacuum source (not shown) may be provided to evacuate the chamber between the inner wall 14 and outer wall 16. It has been found that such a "vacuum jacket" provides better insulating quality than a foam glass jacket. As a result, the rate at which the liquid refrigerant vaporizes and evaporates is reduced. Thus, a smaller amount of liquid refrigerant is required for the preparation of a given amount of frozen product.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A cryogenic processor for liquid feed preparation of a free-flowing frozen product comprising:

a freezing chamber having a substantially conical shape;

a gas diffusion chamber formed above the freezing chamber, the gas diffusion chamber having a vacuum assembly and an air inlet both in fluid communication with the gas diffusion chamber, the vacuum assembly arranged and adapted to draw ambient air through the air inlet and into the gas diffusion chamber to establish a controlled air flow about the orifices to prevent liquid composition from freezing in the orifices or their associated feed droppers;

a feed tray or number of trays overlying the gas diffusion chamber arranged and adapted to receive liquid composition from a delivery source, the tray having a plurality of orifices for regulating discharge of uniformly sized droplets of the composition from the tray, whereby the droplets are delivered by gravity through the gas diffusion chamber and then into the freezing chamber there-below; and an air intake filter disposed at the air inlet to filter contaminants from the air passing through the inlet and about the orifices.

2. The cryogenic processor as defined in claim 1, wherein the air intake filter is designed to filter contaminants 0.2 microns in size and larger.

3. The cryogenic processor as defined in claim 1, wherein the plurality of orifices is further defined as having an associated plurality of feed droppers for producing droplets from the liquid composition.

4. The cryogenic processor as defined in claim 1, in which the air inlet is further defined as having a means for adjustment, such that the means for adjustment regulates the amount of incoming ambient air.

5. The cryogenic process as defined in claim 4, wherein the means for adjustment includes a motor.

6. The cryogenic processor as defined in claim 1, in which the freezing chamber is further defined as having an interior surface and a means for baffling fluid flow, the means for baffling arranged and attached to the interior surface of the freezing chamber such that incoming liquid refrigerant is prevented from creating a disruptive cyclonic flow within the freezing chamber.

7. The cryogenic processor as defined in claim 1, in which the freezing chamber is further defined by an inner shell and an outer wall, and thermal insulation disposed between the inner wall and the outer wall.

8. The cryogenic processor as defined in claim 7, wherein the thermal insulation is an evacuated space between the outer wall and the inner wall.

9. The cryogenic processor as defined in claim 1, in which the processor is further defined as having a delivery source capable of providing liquid composition to the tray or trays of the cryogenic processor.

10. The cryogenic processor as defined in claim 1, in which the processor is further defined as having a premixing device capable of combining a plurality of compositions in desired concentrations and providing the mixed combination to the delivery source of the cryogenic processor.

11. The cryogenic processor as defined in claim 1, further comprising a control device having a plurality of sensors, the sensors attached to the cryogenic processor such that numerous operating values are measured and sent to the control device as input signals, the input signals interpreted by an appropriate algorithm in a control device such that an output signal is created and sent from the control device to the cryogenic processor which allows for automatic monitoring and production of frozen beaded product.

12. A method of feeding liquid composition to a freezing chamber containing a refrigerant to form beads of frozen product, comprising the steps of:

delivering a liquid feed composition from a source to a feed tray or multiple trays;

discharging the liquid feed composition or compositions from the feed tray or trays through orifices in the form of droplets, via gravity, into a gas diffusion chamber disposed immediately below the orifices;

delivering the droplets into a freezing chamber disposed immediately below the gas diffusion chamber;

providing an intensely cold environment in the gas diffusion chamber and in the freezing chamber, whereby the droplets become substantially pre-cooled during a free fall; and providing a filtered ambient air flow through the gas diffusion chamber and about the plurality of orifices such that the liquid composition does not freeze within the orifices.

13. The method as defined in claim 12, in which the step of providing the air flow about the plurality of orifices is accomplished by a vacuum assembly and an air inlet both in fluid communication with the gas diffusion chamber, the vacuum assembly arranged and adapted to draw ambient air through the inlet and into the gas diffusion chamber to establish a controlled air flow about the orifices to prevent liquid composition from freezing in the orifices.

14. The method as defined in claim 12, further comprising the step of automatically controlling the production of frozen beaded product by incorporating a control device capable of monitoring several operating parameters selected from the group consisting of freezer chamber liquid refrigerant level, rate of refrigerant input, freezer chamber temperature, gas diffusion chamber temperature, rate of incoming ambient air, rate of liquid composition input, and rate of frozen product output; and providing control output signals from the control device capable of adjusting the operating parameters of the processor.

15. A method of feeding liquid composition to a freezing chamber containing a refrigerant to form beads of frozen product, comprising the steps of:

delivering a liquid feed composition from a source to a feed tray;

discharging the liquid feed composition from the feed tray through orifices in the form of droplets, via gravity, into a freezing chamber disposed below the orifices; and providing a controlled and filtered air flow about the orifices.

16. The method as defined in claim 15, wherein the step of providing a controlled air flow includes dynamically regulating the size of an air inlet based upon a temperature at the orifices.

17. The method as defined in claim 15, wherein the step of providing a controlled air flow includes dynamically regulating the size of an air inlet based upon a rate of flow of the liquid feed composition into the feed tray.

18. The method as defined in claim 15, wherein the step of providing a controlled air flow includes dynamically regulating the rate of air flow about the orifices based on a temperature at the orifices.

19. The method as defined in claim 15, wherein the step of providing a controlled air flow includes dynamically regulating the rate of air flow about the orifices based upon a rate of flow of the liquid feed composition into the feed tray.

* * * * *